United States Patent [19]

Dahlén

[11] Patent Number: 5,870,454
[45] Date of Patent: Feb. 9, 1999

[54] TELECOMMUNICATIONS SPEECH/TEXT CONVERSION AND MESSAGE DELIVERY SYSTEM

[75] Inventor: Johan Dahlén, Skoghall, Sweden

[73] Assignee: Telefonaktiebolaget L M Ericsson, Stockholm, Sweden

[21] Appl. No.: 831,719

[22] Filed: Apr. 1, 1997

[51] Int. Cl.$^6$ .................................................. H04M 1/64
[52] U.S. Cl. ............................ 379/88.14; 379/88.13; 379/100.01; 379/100.08; 379/100.13
[58] Field of Search .................... 379/90.01, 93.01, 379/93.07, 93.05, 93.14, 93.15, 52, 67, 88, 89, 93.24, 93.26, 100.01, 100.12, 100.13

[56] References Cited

U.S. PATENT DOCUMENTS

| | | |
|---|---|---|
| 4,473,904 | 9/1984 | Suehiro et al. . |
| 5,175,684 | 12/1992 | Chong .................................. 379/100.07 |
| 5,193,110 | 3/1993 | Jones et al. . |
| 5,231,670 | 7/1993 | Goldhor et al. . |
| 5,247,568 | 9/1993 | Bergsman et al. . |
| 5,333,266 | 7/1994 | Boaz et al. . |
| 5,406,557 | 4/1995 | Baudoin . |
| 5,479,411 | 12/1995 | Klein . |
| 5,487,103 | 1/1996 | Richardson, Jr. et al. . |
| 5,509,060 | 4/1996 | Hall et al. ................................. 379/67 |
| 5,557,659 | 9/1996 | Hyde-Thomson . |
| 5,586,171 | 12/1996 | McAllister et al. ....................... 379/67 |
| 5,600,643 | 2/1997 | Robrock, II ............................. 370/399 |
| 5,617,422 | 4/1997 | Litzenberger et al. .................. 370/401 |
| 5,689,550 | 11/1997 | Garson et al. ............................. 379/89 |
| 5,712,903 | 1/1998 | Bartholomew et al. .................. 379/89 |

FOREIGN PATENT DOCUMENTS

| | | |
|---|---|---|
| 0 586 954 A2 | 3/1994 | European Pat. Off. . |
| 96/09710 A1 | 3/1996 | WIPO . |
| 9609714 A1 | 3/1996 | WIPO . |

OTHER PUBLICATIONS

Hansson, "Evolution of Intelligent Network Concepts", Computer Communications, vol. 18, No. 11, Nov. 1995, pp. 793–801.

Hall et al, "The AT&T Service Circuit Node: A New Element for Providing Intelligent Network Services", AT&T Technical Journal, vol. 70, No. 3/04, 1 Jan. 1991, pp. 72–84.

Bosco, "Voice Services on the Intelligent Network: Intelligent Peripherals and Service Nodes", CSELT Technical Reports, vol. 20, No. 4, Aug. 1992, pp. 347–353.

*Primary Examiner*—Curtis A. Kuntz
*Assistant Examiner*—Melur Ramakrishnaiah
*Attorney, Agent, or Firm*—Nixon & Vanderhye, P.C.

[57] ABSTRACT

An intelligent network telecommunications service allows a calling party (22) to provide a voice message which is converted by the service to a text message. The text message is delivered to any of a plurality of types of media formatters (90), which in turn transmit the text message to corresponding types of receiving equipment (100). The text messages can be delivered to a sole called party or to a distribution list of called parties.

21 Claims, 5 Drawing Sheets

TELECOMMUNICATIONS SPEECH/TEXT CONVERSION AND MESSAGE DELIVERY SYSTEM

BACKGROUND

1. Field of Invention

This invention pertains to intelligent telecommunications networks.

2. Related Art and Other Considerations

Intelligent telecommunications networks have an architecture which offer new and various telecommunications services in a fast, flexible, and cost-effective way. The core of an intelligent telecommunications network includes both a Service Switching Point (SSP) and a Service Control Point (SCP). The Service Switching Point (SSP) is a switching system that can intercept telephone calls and query the Service Control Point (SCP). The Service Control Point (SCP) is a system containing service specific logic and data that, upon being queried by the SSP, returns instructions to the SSP regarding further treatment of the intercepted telephone call.

With the architecture of the SSP and SCP an intelligent telecommunications network (IN) can perform numerous services beyond typical call connection, such as call waiting and call forwarding, as basic examples. Different kinds of devices can be combined with an intelligent network in order to perform and control a predefined flow of operations.

Subscribers to telecommunications networks have long been able to transmit either voice or text messages over the network to a desired destination (i.e., a called party). Current intelligent networks provide a service for the called party of answering the call and permitting the calling party to record a voice message. Subscribers with computer capabilities are able to transmit digital textual messages to other computers over telecommunications networks.

What is lacking however, and an object of this invention, is method and apparatus for enabling a voice caller to provide a textual message to a called party.

SUMMARY

An intelligent network telecommunications service allows a calling party to provide a voice message which is converted by the service to a text message. The text message is delivered to any of a plurality of types of media formatters, which in turn transmit the text message to corresponding types of receiving equipment. The text messages can be delivered to a sole called party or to a distribution list of called parties.

In accordance with the invention, a switching service point (SSP) recognizes and intercepts a call from a calling party requiring speech/text translation. A control service point (SCP), which receives the call from the switching service point (SSP) upon interception, issues a prompt-enabling signal. In response to the prompt-enabling signal, a prompter & collector generates a menu of requested information from the calling party. The calling party can respond either by voice or DTMF signals. The prompter & collector uses responses from the calling party to construct a current call record. Upon receipt of the current call record, the control service point (SCP) issues a conversion-enabling signal to a speech/text converter. In response, the speech/text converter sets up a connection to receive a voice message from the calling party and converts the speech in the voice message to a text message. The text message is optionally stored in a service data point (SDP). The control service point forwards the text message to the called party(ies).

As an additional option, a language converter is connected to the speech/text converter for converting the text message from a first language to a second language.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 2 is a schematic view showing the relationship of FIG. 2A and FIG. 2B.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
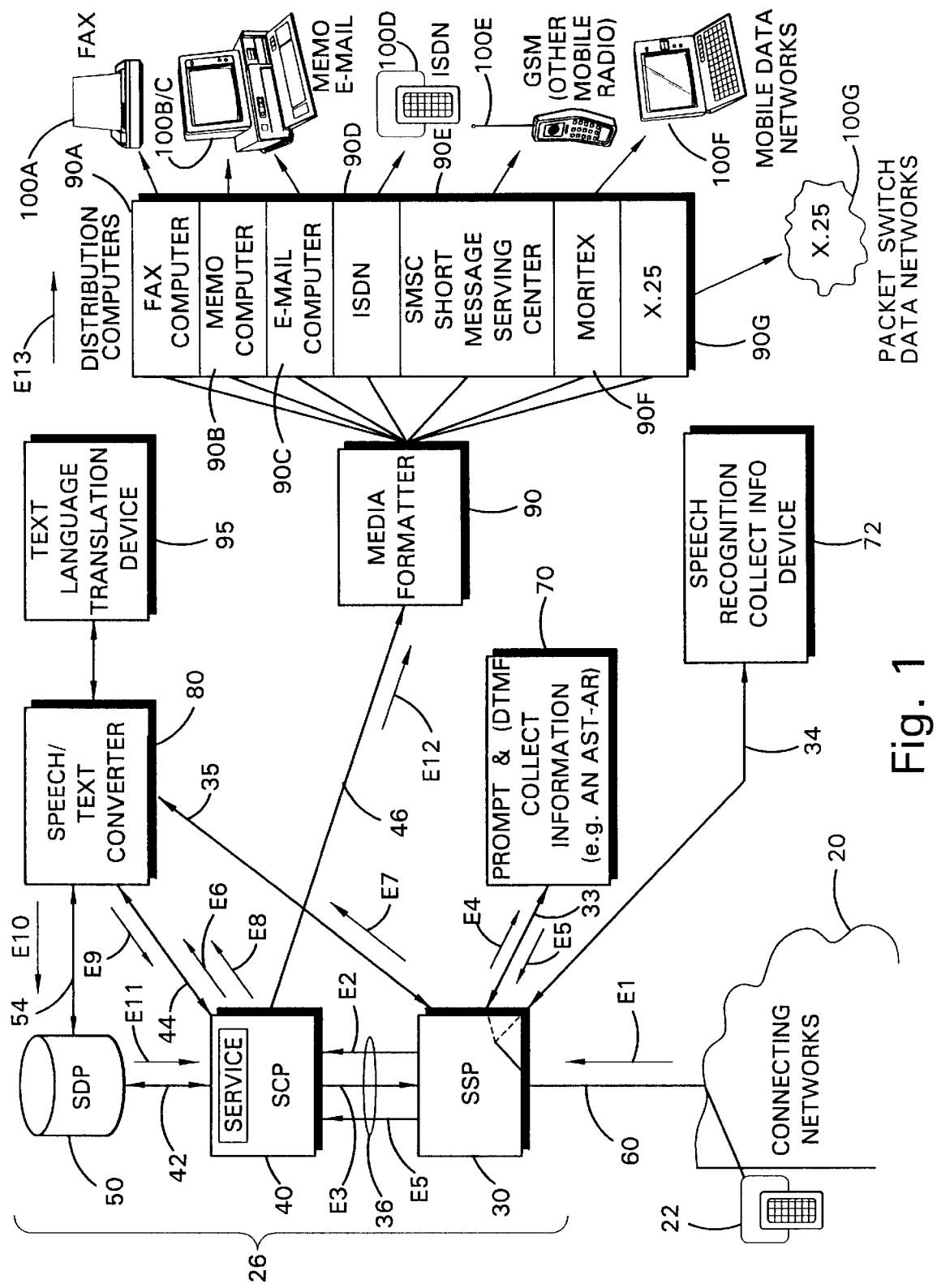
FIG. 1 is a schematic view of portions of an intelligent telecommunications network according to an embodiment of the invention.

FIG. 1 shows that one or more connecting telecommunication networks 20 connect a calling party or subscriber 22 to a set 26 of intelligent call-handling components or points of an intelligent telecommunications network. In accordance with the present invention, the set 26 of intelligent call-handling points of FIG. 1 permit the calling party 22 to utter a voice message which is converted from speech to text, and a resultant text message delivered to one or more called parties in one or more media formats.

In typical fashion, the calling party 22 is connected to a local exchange which forms part of a first one of the connecting networks 20. The first and any other of the connecting networks 20 conventionally includes one or more switching exchanges. Connection networks 20 can include any type of network which is connectable to an intelligent network, including mobile, fixed, and ISDN networks, for example.

The set 26 of intelligent call-handling points of the present invention includes a switching service point (SSP) 30, a service control point (SCP) 40, and a service data point (SDP) 50. The structure, interconnection, and operation of SSPs, SCPs, and SDPs generally are known in the art, so that only aspects of SSP 30, SCP 40, and SDP 50 which are particularly pertinent to the present invention are herein described.

SSP 30 is connected to connecting networks 20 over link 60. Link 60 can carry any type of standard protocol, including INAP, CSI, SCI+, AIN, or SS7, for example. As described hereinafter, SSP 30 serves e.g., to selectively connect the calling party's channel on link 60 with a potential plurality of intelligent peripheral devices. Such devices include DTMF prompter & collector 70 (e.g., an ASTDR announcement machine), speech recognition prompter & collector 72, and speech/text converter 80. Accordingly, SSP 30 is connected by voice/data links 33 and 34 to prompter & converters 70 and 72, respectively, for call connections with the calling party. Similarly, SSP 30 is connected by voice link 35 to speech/text converter 80. In customary fashion, SSP 30 is connected to SCP 40 by link 36.

Service Control Point (SCP) 40 is connected in customary fashion to SDP 50 by link 42. SCP 40 and SDP 50 are connected to speech/text converter 80 by data interface links 44 and 54, respectively. In addition, SCP 40 is connected by data interfaces or links 46 (e.g., TCP/IP, for example) to a plurality of media formatters. While block 90 of FIG. 1 generically represents a set of different types of media formatters, blocks 90A–90G illustrate specific types of media formatters which are connected to SCP 40 and over which a text message can be transmitted. Since other types of media formatters are also possible, the examples of blocks 90A–90G are not deemed to be exhaustive.

In an optional embodiment, speech/text converter 80 is connected to a language translator intelligent peripheral 95. Language translator 95 is capable of translating text in a first language to text in a second language (e.g., from English to Swedish).

FIG. 1 together with FIG. 2 show steps involved in the performance of a voice-to-text converted intelligently handled call in accordance with a mode of the present invention. As a preliminary matter, the particular calling party 22 below discussed is known as a registered subscriber by virtue of the fact that he/she has previously registered with the voice-to-text conversion service, and upon registration had entered a subscriber profile into SDP 50. The subscriber profile can be created in a number of conventional ways, as by submission of written information for subsequent entry into SDP 50 by the service provider, or by telephonic interview in which the subscriber 22 enters profile information in response to a menu-based questionnaire.

As shown as step 200 in FIG. 2, the calling party 22 initiates the service by dialing a directory number of the called service. The directory number could be a premium rate number or a free phone number, for example. Different directory numbers can be provided in accordance to enable the calling party or subscriber 22 to choose between different aspects of the service, such as DTMF prompter & collector 70 and speech recognition prompter & collector 72.

The call from the calling party with the directory number of the voice-to-text conversion service is routed by conventional routing techniques to SSP 30, ultimately reaching SSP 30 over link 60 as shown by event E1 in FIG. 1. SSP 30 recognizes the dialed directory number as corresponding to the voice-to-text conversion service and sends the call to SCP 40, as indicated by event E2. Then, by sending a prompt-enable signal depicted as event E3, SCP 40 orders SSP 30 to connect the call to an appropriate one of the prompter & collectors 70, 72.

In response to the prompt-enable signal, SSP 30 connects the appropriate one of the prompter & collectors 70, 72 to the calling party. In the particular example shown in FIG. 1, it so happens that calling party 22 dialed a directory number which involved DTMF interaction with the service. Accordingly, in the example shown in FIG. 1, SSP 30 connects the calling party on line 31 to DTMF prompter & collector 70, as indicated by event E4. It should be understood, alternatively, that were a voice interaction requested, a similar connection could instead be made on line 32 to speech recognition prompter & collector 72.

The prompter & collector conducts an interchange or menu-based dialogue with the calling party. As understood from the foregoing, prompter & collector 70 conducts a primarily DTMF dialogue; prompter & collector 72 conducts a dialogue which is primarily speech. The preponderance of the steps shown in FIG. 2A essentially pertain to the nature and substance of such dialogue.

Figure 2A:
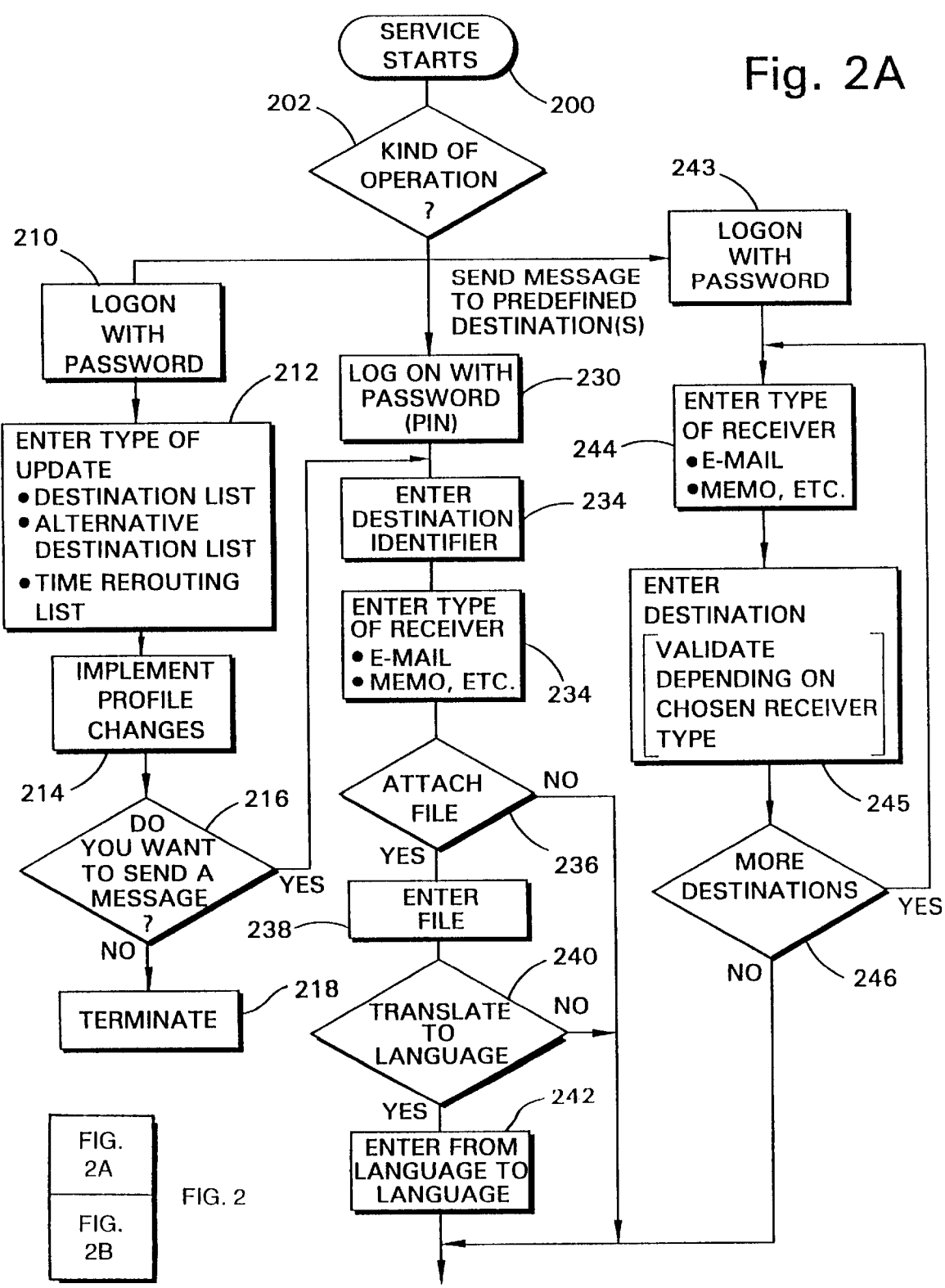
FIG. 2A and FIG. 2B are flowcharts showing interaction with a calling party in connection with a speech/text conversion service provided by the telecommunications network of FIG. 1.

At step 202 of the dialogue, the prompter & collector presents a main menu by inquiring whether the calling party 22 wishes (1) to change his/her profile; (2) to send a message to a pre-defined called party number; or (3) to send a message to a previously undefined called party number. In response, the calling party 22 enters an input corresponding to the desired one of the main menu options (1), (2), or (3). FIG. 2A reflects steps undertaken in accordance with response to each of these options.

Should calling party 22 desire to change his/her profile, steps 210, 212, 214, and 216 are performed. At step 210, the prompter & collector requests that the calling party enter a password. Assuming the password is correctly entered, at step 212 the prompter & collector provides the calling party with an opportunity to provide a change or update to any one or more of a plurality of called party lists. Examples of called party lists include a primary distribution list, one or more alternate distribution lists, or a timed rerouting list. The distribution lists can be arranged by a group characteristic or other common denominator. Each called party list is assigned a unique called party list name by the calling party 20.

Step 212 permits numerous changes to one or more called party lists. For example, the calling party 22 can select an extant list of called parties, and within that list change one or more parameters with respect to one or more called parties belonging to the list. Alternatively or in addition, calling party 22 can add or delete one or more parties from a called party list, and then save the modified called party list as a new called party list (assigning a new list name thereto) or use the modified called party list to replace the older called party list.

As mentioned above, one type of called party list is a timed rerouting list. Timed rerouting lists of called parties can take several forms. A first example of a timed rerouting list is known as a destination invariable timed rerouting list. The destination invariable timed rerouting list is a list of called parties to whom a specified message is to be transmitted at a predetermined call time, the list having only one possible destination identifier for each called party. The predetermined called time, also known as the target time, can be specified by time and/or date (e.g., a "Merry Christmas" text message to be transmitted on Christmas Day; a reminder to be transmitted every day of the last week of the month).

A second example of a timed rerouting list is known as a destination alternative timed rerouting list. A destination alternative timed rerouting list is a list of called parties for whom the calling party specifies both (1) a primary destination and a primary destination time frame, and (2) an alternate destination and an alternate destination time frame. If the time selected for the call occurs during the primary destination time frame, the service sends the call to the primary destination at the selected call time. On the other hand, if the time selected for the call occurs during the alternate destination time frame, the service sends the call to the alternate destination at the selected call time.

Timed rerouting lists can be composed of one or more other lists. Parameters in the called party lists, including the primary destination, the primary destination time frame, the alternate destination, and the alternate destination time frame can be edited during step 214.

Thus, at step 212 the prompter & collector allows the calling party to select among these list types, and then within each list type to add, delete, or edit members of the lists and fields associated with each member (e.g., called party identifiers [e.g., directory number, internet number, etc.] and receiver equipment types). Step 214 shows updating of the subscriber profile in SDP 50, the updating depending on the particular profile changes requested in step 212. In connection with step 214, the prompter & collector prepares a package of appropriate updating information and places a separate call via SSP 30 to SCP 40, enabling SCP 40 to update the subscriber's profile in SDP 50 in accordance with the package of updating information. To maintain simplicity of FIG. 1, the links and events involved with the subscriber profile are not illustrated.

Preferably upon confirmation from SCP 40 that the subscriber's profile in SDP 50 has been updated, the prompter & collector inquires whether the calling party now desires to place a call (step 216). If the response from the calling party 22 is negative, the connection is terminated as indicated by step 218. Otherwise, processing continues with step 232 which is discussed below in connection with main menu option (2).

Figure 2B:
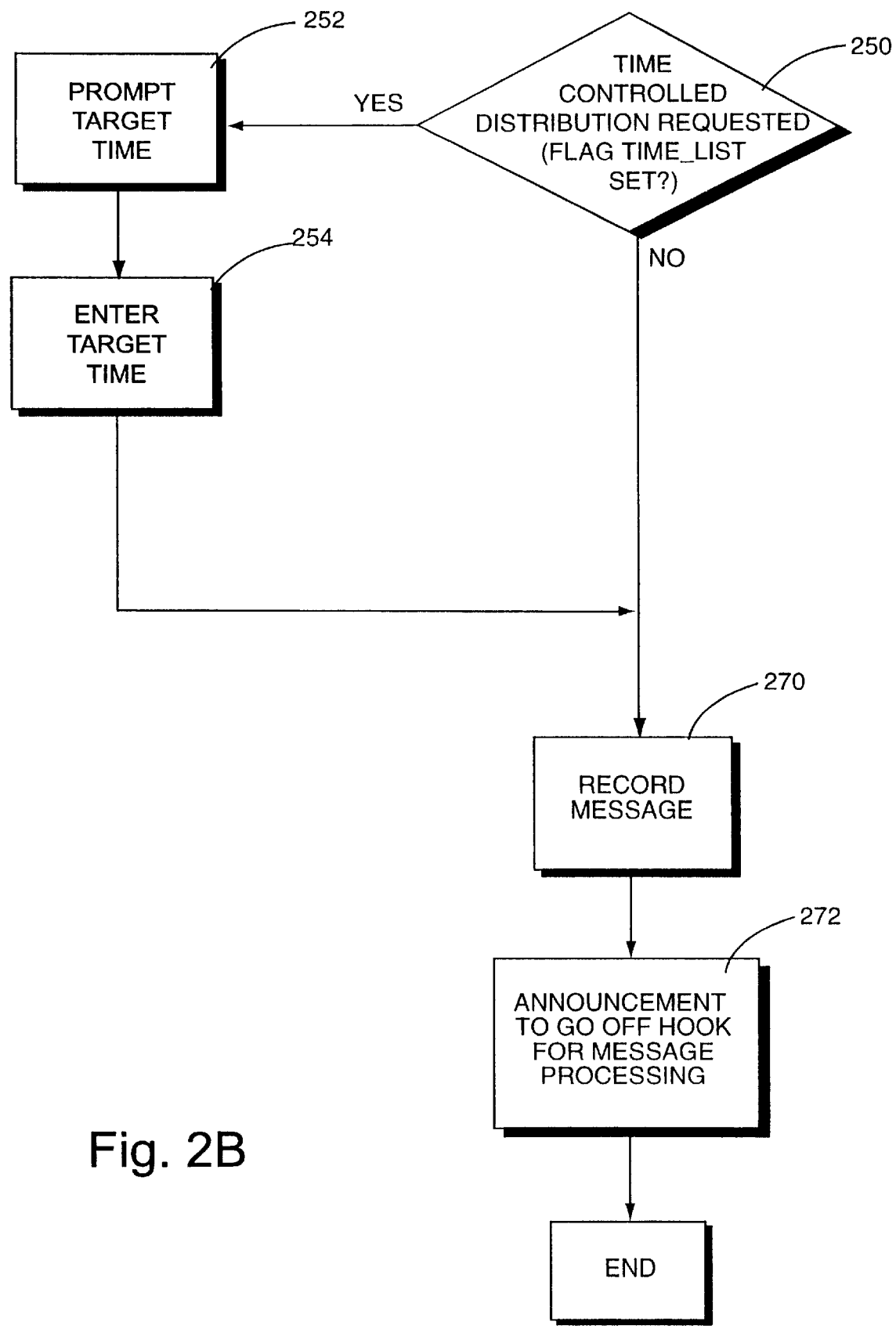

Should calling party 22 select main menu option (2) in order to send a message to a pre-defined called party number, steps 230, 232, 234, 236, 238, 240, and (possibly) 242) are performed prior to performing the steps shown in FIG. 2B. At step 230, the prompter & collector requests that the calling party enter a password. Assuming the password is correctly entered, or that operation resumes from step 216, step 232 is executed.

At step 232, the prompter & collector requests that the calling party to enter the destination identifier(s) of the called party(ies). Such can be done by entering the destination identifier of a single called party, or by selecting from one of the lists mentioned in step 212—the primary distribution list, one or more alternate distribution list, or a time rerouting list. If a time rerouting list is selected, at step 232 a flag time__list is set.

Step 234 indicates that prompter & collector provides an opportunity for calling party 22 to specify what type of receiving equipment is to receive the text message generated by the service. For example, as represented by the blocks 90A–90G in FIG. 1, a variety of types of receiving equipment (fax computer, memo computer, E-mail computer, ISDN receiver, etc.) may be available for sending the text message to the particular called party. At step 234 the prompter & collector gives calling party 22 an opportunity to specify which receiving equipment of the called party(ies) is to be used. In one particular embodiment, if no particular indication is made, a default type of receiving equipment is automatically presumed. The default type of equipment can be specified in an initial profile submission for the subscriber or automatically assigned by the service. In the case of a subscriber-defined default equipment type, it should be understood that the steps of main menu option (1) would optionally suitably include a step for enabling change to such a default parameter.

At step 236 the prompter & collector inquires whether calling party 22 wishes to attach a file. File attachment means that calling party 22 wishes to include in the message a copy of a standard message. The standard message can be one or more routine messages which are prone to use by many calling parties and hence generally available or, in a more sophisticated embodiment, can be one of the previous message of this particular calling party which has been stored and identified in SDP 50 for calling party 22. If file attachment is not desired, processing continues with the steps shown in FIG. 2B. If file attachment is desired, the prompter & collector permits calling party 22 to select the prestored message at step 238. In this regard, prompter & collector can either simply request calling party 22 to enter an identifier or code for the prestored message, or (at subscriber option) can play a repertoire of prestored messages and permit calling party 22 to select therefrom. In addition, after the prestored message (e.g., attached file) has been selected, the prompter & collector inquires at step 240 whether the attached file needs to be translated from a first language to a second language. If an affirmative response is received from calling party 22, step 242 is conducted. At step 242, the prompter & collector can present a menu for selection of the second language. In response to the second language selection, the prestored message is translated (e.g., from Swedish to English, for example). Otherwise, if language translation is not required, execution continues with the steps shown in FIG. 2B.

In connection with the steps described above in connection with main menu option (2), the prompter & collector begins constructing a current call record which thus far potentially includes the information entered in steps 232, 234, and 238, for example. Thus far, the current call record includes the destination identity(ies) and receiver equipment types of the called party(ies), and whether any prestored message is to be attached.

The steps of FIG. 2B begin with step 250. At step 250 the prompter & collector checks whether the flag time__list was set at step 232. If flag time__list is set, it is realized that the calling party 22 desires for the distribution of the call to be time-controlled, e.g., for the call to be placed at a predetermined (e.g., non-current) call time or "target" time. Accordingly, if flag time__list is set, at step 252 the prompter & collector requests calling party 22 to enter the time at which the call is to be placed to the calling party(ies) [the predetermined call time or target time].

Thus, at step 252, calling party 22 can indicate a particularly timed distribution of the message rather than normal distribution. In response, at step 254 the prompter & collector permits calling party 22 to enter the predetermined call time or target time for the distribution. In entering the target time at step 254, calling party 22 may simply enter or speak the digits of the target time, or may request a menu of routing times and respond as desired to the menu. The target time information gleaned at step 254 is included in the current call record for calling party 22.

Upon completion either of step 254 or in the case the flag time__list is not set at step 250, step 270 is executed. At step 270, the service prepares prompts and receives the voice message from calling party 22. Step 270 of FIG. 2B shows the prompter & collector prompting calling party 22 to record (e.g., to speak) his/her message (after a predetermined ready signal [e.g., "beep"]).

As shown by event E5 in FIG. 1, the prompter & collector sends the current call record for calling party 22 via SSP 30 to SCP 40. As reflected by event E6 in FIG. 1, on link 44 SCP 40 issues a conversion-enable signal effectively to order speech/text converter 80 to request on link 35 that SSP 30 next connect the call with calling party 22 to converter 80 on link 35. Event 7 shows SSP 30 making the connection of calling party 22 to converter 80, which results in issuance of the predetermined ready signal (e.g., "beep").

Speech/text converter 80 records the voice message from calling party 22 and temporarily stores the voice message which is incrementally converted to text. After the voice message is received, converter 80 plays an announcement that the calling party 22 should hang up and that his/her text message will be transmitted (see step 272 of FIG. 2B). Converter 80 notifies SCP 40 upon completion of the speech to text conversion. If requested by calling party at steps 240 and 242, as Event E8 the SCP 40 issues a language conversion-enable signal on link 44 to speech/text converter 80, which in turn transmits the message text in a first language to language translator 95 along with instructions regarding the translation (from which first language to which second language, for example). Upon completion of language translation, SCP 40 is so advised via speech/text converter 80.

Upon being advised that the activities of voice to text converter 80 (including any delegated activities performed by language translator 95) are completed (as indicated by event E9), SCP 40 directs converter 80 to transmit the text message prepared by converter 80 to SDP 50. The transmission of the text message from converter 80 to SDP 50 is indicated as event E10. The text message is stored in an appropriate record in SDP 50 for the current call for calling party 22.

Event E11 shows SCP 40 obtaining from SDP 50 the text message stored for the call. Event 11 can be implemented in either of several ways. For a call that is not to a called party on a timed rerouting list, SCP 40 obtains the text message for the call as soon as it is available in SDP 50. SDP 50 may be programmed to forward the text message to SCP 40 upon receipt thereof by SDP 50 or otherwise notify SCP 40 of receipt thereof by SDP 50. Alternatively, SCP 40 may request the text message in timed relation to occurrence of event E9.

For a call that is to a called party on a destination invariable timed rerouting list, the text message and associated call parameters are stored in SDP 50. In addition, the target time of the call and an associated pointer are stored in a special time-checked queue of SDP 50. SDP 50 periodically checks its time-checked queue and, when the target time is reached, uses the associated pointer to obtain the text message and associated call parameters (e.g., including those in the current call record) and forwards the same to SCP 40 as event E11. Those skilled in the art recognize that such a procedure as described in this paragraph can be implemented in several ways, including using a UNIX crontab process, for example.

In the case that the call that is to a called party on a destination alternative timed rerouting list, a procedure for event E11 similar to that described in the preceding paragraph is implemented. However, in addition, SDP 50 checks the target time against both the primary destination time frame and alternate destination time frame to determine which of the primary destination identifier and the alternate destination identifier is to be utilized.

Upon completion of event E11 and using the receiving equipment type information for the current call (gleaned from the current call record), SCP 40 sends a transmission to an appropriate media formatter 90 (see event E12).

The receiving equipment type information is used to determine which type of media formatter 90 should be used. For example, if the receiving equipment type is a fax machine, the transmission of event 12 is directed to fax computer 90A connected to SCP 40. Alternatively, if the receiving equipment type is an electronic mail computer, the transmission of event 12 is directed to e-mail computer 90B connected to SCP 40, and so forth. The transmission of event E12 includes both the destination identifier (e.g., directory number or internet number) of the called party, as well as the text message prepared by converter 80 and obtained from SDP 50.

As further shown in FIG. 1, the particular media formatter 90 which receives the transmission of event E12 uses the destination identifier to transmit the text message to corresponding receiving equipment. The further transmission from the media formatter 90 to the receiving equipment is shown as event E13 in FIG. 1. Six illustrative types of receiving equipments 100A, 100B/C, 100D, 100E, 100F, 100G are shown in FIG. 1, corresponding to media formatters 90A, 90B and 90C, 90D, 90E, 90F, and 90G, respectively. Equipment 100A is a fax machine; equipment 100B/C is a computer or computer network; equipment 100D is an ISDN device; equipment 100E is a GSM device; equipment 100F is a node of a mobile data network; equipment 100G is a node on a packet switching X.25 protocol data network.

Thus, the called party at the location of the selected one of receiving equipments 100 receives a text message which has been translated by converter 80 from the voice of calling party 22 to text. The service of the present invention thus has many advantages, particularly to calling parties who do not have text generating terminals connected to networks.

Should calling party 22 have instead selected main menu option (3) in order to send a message to a previously undefined called party number, steps 243, 244, 245, and 246 of FIG. 2A would have been conducted in lieu of steps 230–242 prior to performance of the steps of FIG. 2B. In particular, at step 243 calling party 22 would have been prompted for his password. Then, analogously to step 234, at step 244 the prompter & collector would prompt for the receiving equipment type of the called party. At step 245 the prompter & collector would request that calling party 22 enter the destination identifier for the called party. Then, at step 246, the prompter & collector would inquire whether the message is to be sent to other destinations. If the response from calling party 22 were affirmative at step 246, steps 244 and 245 would be executed for each additional destination to which the message is to be sent. When calling party 22 is finished entering destinations, execution continues with step 250 of FIG. 2B.

Figure 3:
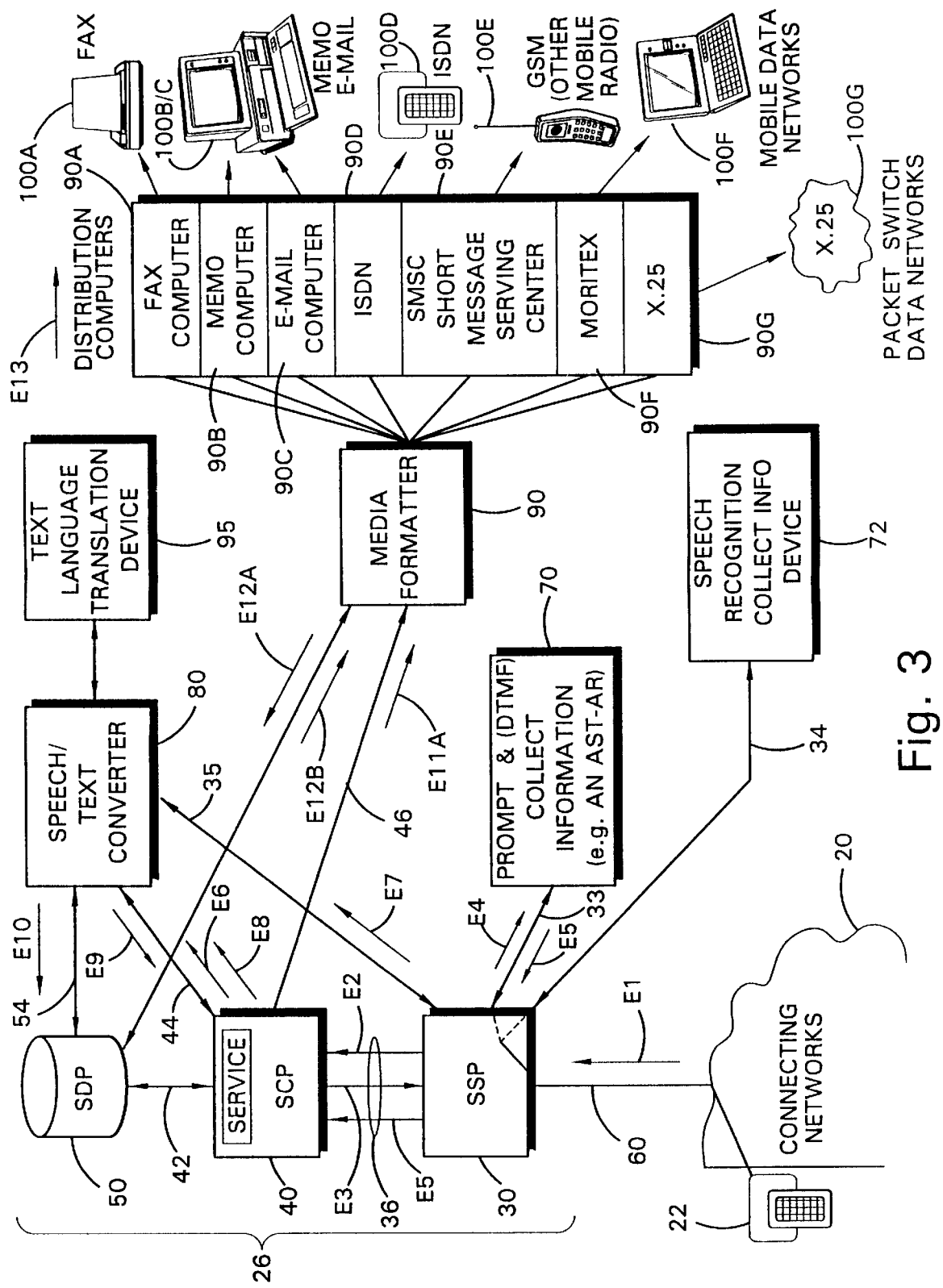
FIG. 3 is a schematic view of portions of an intelligent telecommunications network according to another embodiment of the invention.

FIG. 3 shows another embodiment having procedure identical to that of FIG. 1, with the exception that events E11 and E12 of FIG. 1 are replaced by events E11A and E12A in FIG. 3. In the embodiment of FIG. 3, event E11A depicts SCP 40 ordering the appropriate media formatter 90 to fetch an appropriate voice-to-text translated file from SDP 50. Event E12A shows media formatter 90 requesting the voice-to-text translated file from SDP 50; event E12B shows SDP 50 transmitting the voice-to-text translated to media formatter 90.

It should be understood that many variants of the foregoing are encompassed by the present invention. For example, whereas the foregoing has assumed the case of a registered subscriber, non-registered subscribers may also utilize the service of the invention. Non-registered subscribers would be required, however, upon placing each call, to enter information at least some of which is commensurate with that described above with respect to the subscriber profile.

Moreover, the directory number for the service which is dialed by the calling party can be tailored for particular circumstances. For example, one directory number may be provided for registered subscribers, while a second directory number may be allocated for non-registered subscribers. Alternatively, in contrast to the particular profile updating procedure described above, a special directory number may be utilized to enable registered subscribers to update their profiles.

As described above, speech/text converter 80 can perform conversion of a speech message to a text message. In the embodiment illustrated in FIG. 4, speech/text converter 80 performs conversion of a text message to a speech message. The intelligent telecommunications network of FIG. 4 has SSP 30, SCP 40, SDP 50, prompter & collector 70, speech recognition prompter & collector 72, speech/text converter 80, and text language translator 95 in like manner as the network of FIG. 1 and FIG. 3. In addition, however, the network of FIG. 4 has a play message device 97. Play message device is connected to speech/text converter 80, to SCP 40, and to SSP 30 as shown in FIG. 4.

The network of FIG. 4, in addition to providing the speech to text conversion described with reference to FIG. 1, for example, also provides a service of converting text messages to speech messages. In brief, calling party 22 dials the directory number for the text-to-speech conversion service using a telephone. Calling party 22 is connected to the service via SCP 30. SCP 30 sets up a dialogue with the calling party, with the calling party responding either by voice or DTMF. In the course of the dialogue, calling party 22 selects from one of a plurality of prestored text messages. Further, calling party 22 selects a distribution list and (optionally) a time of delivery for the messages. The establishment and editing of distribution lists are understood with reference to preceding discussion. Upon completion of the dialogue, SCP 30 enables conversion of the text message to voice and (at the time selected by the calling party) arranges delivery of the voice message to the called party(ies) on the distribution list. Delivery of the voice messages is to phone-based networks 110.

Figure 4:
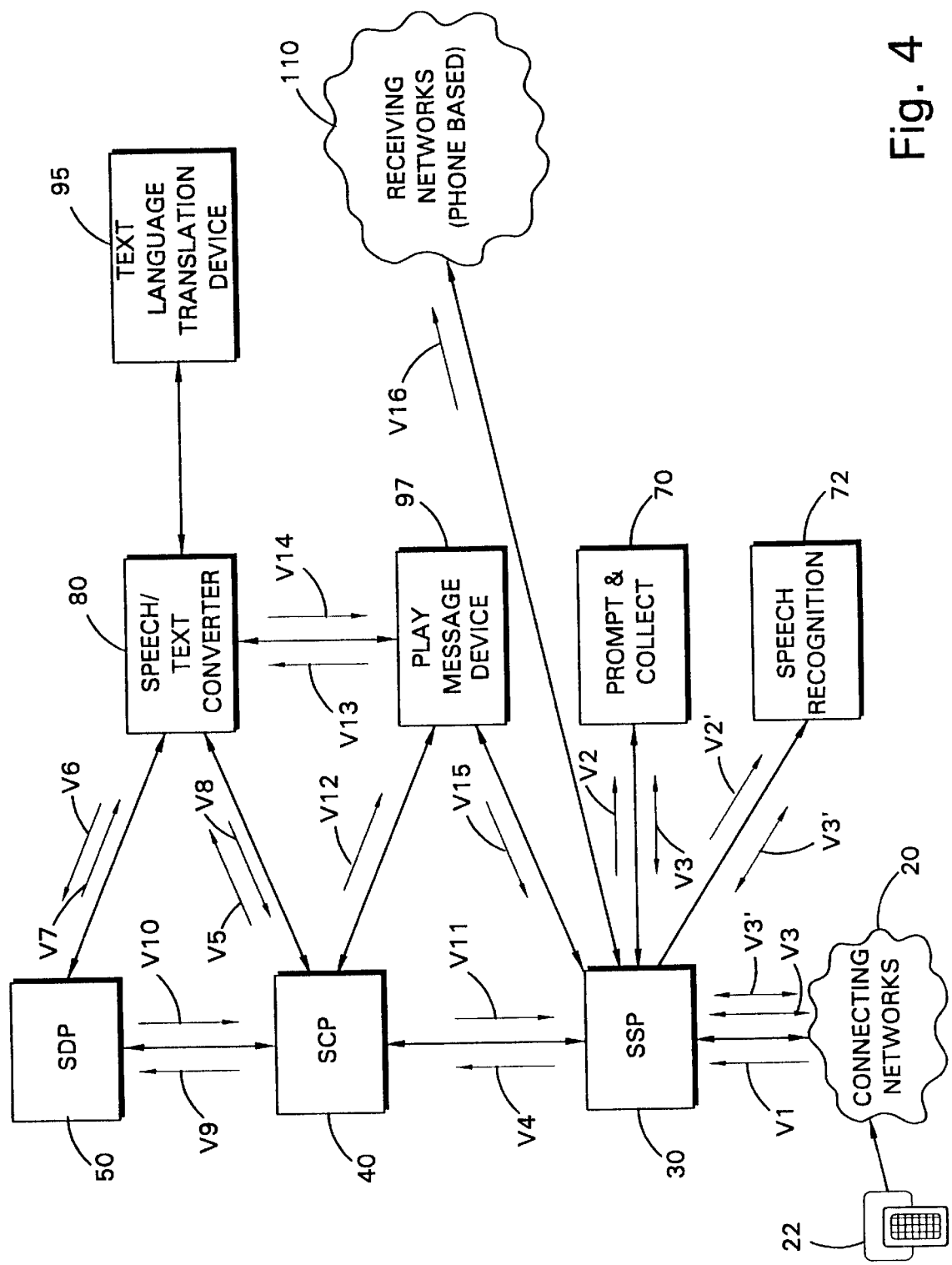
FIG. 4 is a schematic view of portions of an intelligent telecommunications network according to yet another embodiment of the invention.

Events in the course of the text to speech conversion and distribution service of the invention are depicted in FIG. 4. As shown by event V1, calling party 22 dials the directory number of the conversion and delivery system of the present invention. The call is routed through the connecting networks 20 to SSP 30. Depending on whether calling party 22 dialed a speech-interfacing or DTMF-interfacing service, SSP 30 enables one of DTMF prompter & collector 70 (e.g., an AST-DR announcement machine) or speech recognition prompter & collector 72 to conduct the dialogue with calling party 22. SSP 30 enables the dialogue by sending an enablement signal to the appropriate one of the prompter & collectors 70, 72, as indicated by alternate events V2 and V2', respectively. The dialogues, depicted by events V3 and V3', respectively, are routed via SSP 30.

As part of the dialogue, prompter & collectors 70, 72 provide a series of audible menus. The menus include menus to select a desired prestored text message; menus to select a distribution list of called party(ies) to whom the message is to be delivered; and, a menu (optional) which permits calling party 22 to select delivery of the message either immediately or at a target time selected by calling party 22.

When the dialogue is completed, the prompter & collectors 70, 72, prepare and send to SCP 40 a current call record which includes pertinent information gleaned during the dialogue. Forwarding of the current call record is depicted by event V4 in FIG. 4. Upon receipt of the current call record, SCP 40 knows which one of the plurality of prestored messages text messages is to be sent, to whom, and when. Accordingly, event V5 shows SCP 40 ordering speech/text converter 80 to create a voice message from a file stored in SDP 50.

Event V6 of FIG. 4 shows speech/text converter 80 fetching a file associated with the particular prestored text message indicated by SCP 40. The text file is sent to speech/text converter 80 from SDP 50 as event V7. Speech/text converter 80 then performs the text to speech conversion, and upon completion sends a speech message ready signal to SCP 40 as event V8.

Upon receipt of the speech message ready signal, SCP 40 prepare to set up the call in a number of ways. In a first way, according to one mode of the invention the SCP 40 has the directory identifier of the called party in the current call record. In another mode of the invention, on the other hand, SCP 40 sends a fetch distribution list signal to SDP 50, as indicated by event V9. In this regard, in this other mode of the invention the current call record contains only an indication of which distribution list was selected by calling party 22, not information necessary for calling the members of the distribution list (directory identifiers, etc.). The called party 22 has its distribution lists and parameters thereof (directory identifiers, etc.) stored in SDP 50. Event V10 shows SDP 50 responsively sending the distribution list parameters to SCP 40.

Event V11 shows SCP 40 requesting SSP 30 to set up the call(s) to the called party(ies), using the directory identifier(s) obtained as described above. As the call(s) is set up, SCP 40 sends a play-message signal to play message device 97 as event V12. In response to the play-message signal, play message device 97 sends a message-fetch signal to speech/text converter 80, as indicated by event V13. In response to the message-fetch signal, speech/text converter 80 sends the message to play message device 97 (event V14). Play message device 97 then audibly reproduces the message, with the audible message being transmitted to SSP 30 (as shown by event V15) and switched through SSP 30 for transmission to the receiving networks (event V16) wherein it is ultimately forwarded to and heard by the called party(ies).

As a modification of the foregoing, the text message can first be translated from a first language to a second language (e.g., Swedish to English) by translation device 95 prior to text to speech translation, resulting in a voice message that is reproduced in the second language by play message device 97.

In the network and service of FIG. 4, it should be understood that one or more functions may be consolidated at appropriate nodes or points of the network. For example, play message device 97 may be incorporated in speech/text converter 80.

As an example of usage of the text to speech conversion and delivery system of the present invention, suppose a mute person observed a fire emergency in or near his residence. Upon calling the service of the invention, the calling party (the mute person) could select a prestored text message that has the following content: "Fire emergency. Please send help to {address}. {name}" The text message would have been earlier prepared and stored in a file at SDP 50 for the calling party, and would include his residential address and name as indicated. After selecting the prestored text message (e.g., by selecting a message number corresponding to the message content), the calling party selects a distribution list. The calling party may have the following distribution lists: (1) fire department; (2) police department; (3) neighbors. For the supposed emergency here discussed, distribution list (1) would be chosen. In addition, the calling party would direct that the message be sent immediately, rather than deferred to a target time.

For sake of expediency, the present invention permits calling party 22 to bypass the dialogue/menu process when calling party 22 dials a special express directory number for the service. Upon dialing of the express directory number, calling party 22 can rapidly enter a series of tones, for example, the first tone corresponding to a message number, the second tone to a distribution list number. Further rapidity of calling is achieved when the special express directory number for the service is stored on the calling party's phone as a speed dial number.

The usage of distribution lists and timed rerouted lists for text to speech conversion service is understood from an analogous discussion concerning the speech to text conversion service. For the text to speech conversion service, the calling party may prefer to have its pertinent information (context of messages, distribution lists, etc.) manually entered in SDP 50. Alternatively, such information can be remotely entered through a profile set up and change process similar to that previously described with respect to the speech to text conversion service.

While the invention has been particularly shown and described with reference to the preferred embodiments thereof, it will be understood by those skilled in the art that various alterations in form and detail may be made therein without departing from the spirit and scope of the invention. For example, the functions of SDP 50 can be consolidated and performed by SCP 40 by including a database in SCP 40, if such is desired or beneficial.

The embodiments of the invention in which an exclusive property or privilege is claimed are defined as follows:

1. A telecommunications system which translates a voice call into a textual message, the telecommunications system comprising:
   a switching point which recognizes and intercepts a call from a calling party requiring speech to text translation;
   a service control point which receives the call from the switching point upon interception and which issues a prompt-enabling signal and a conversion-enabling signal;
   a prompter which, in response to the prompt-enabling signal generates a menu of requested information from the calling party;
   a speech/text converter which, in response to the conversion-enabling signal, receives a voice message from the calling party and converts the speech in the voice message to a text message; and
   wherein the service control point controls forwarding of the text message to a called party in accordance with a response from the calling party to at least some of the requested information.

2. The system of claim 1, further comprising a service data point which stores the text message and from which the service control point retrieves the text message prior to forwarding of the text message to the called party.

3. The system of claim 1, further comprising a language converter connected to the speech/text converter for converting the text message from a first language to a second language.

4. The system of claim 1, wherein the service control point forwards the text message to a called party at a called party routing address, and wherein the routing address is an address of a media formatter.

5. The system of claim 1, wherein the media formatter is one of an electronic mail generator, a facsimile generator, a computer memo generator, an ISDN transmission generator, a packet switching generator, and a mobile data generator.

6. The system of claim 1, wherein the menu of requested information from the calling party requires that the response from the calling party be one of a voice response or a DTMF response.

7. The system of claim 1, wherein the menu of requested information generated by the prompter requires the calling party to identify a type of media formatter which is to receive the text message.

8. The system of claim 7, wherein the media formatter being one of an electronic mail generator, a facsimile generator, a computer memo generator, an ISDN transmission generator, a packet switching generator, and a mobile data generator.

9. The system of claim 1, wherein the service control point forwards the text message to a distribution list of called parties in accordance with a response from the calling party to at least some of the requested information.

10. The system of claim 1, wherein the service control point orders the media formatter to fetch the text message from a service data point whereat the text message is stored.

11. A method of using a telecommunications system to translate a voice call into a textual message, the method comprising:
   at a switching point, recognizing and intercepting a call from a calling party requiring speech to text translation;
   upon the intercepting, using a service control point to issue a prompt-enabling signal and a conversion-enabling signal;
   in response to the prompt-enabling signal generating a menu of requested information from the calling party;
   in response to the conversion-enabling signal, obtaining the voice message from the calling party and converting speech in the voice message to a text message;
   using the service control point to forward the text message to a called party in accordance with a response from the calling party to at least some of the requested information.

12. The method of claim 11, wherein:
   the menu of requested information is generated by prompter in response to the prompt-enabling signal generated by the service control point; and
   the converting of the speech in the voice message to a text message is performed by a speech to text converter in response to the conversion-enabling signal generated by the service control point.

13. The method of claim 11, further comprising storing the text message in a service data point and using the service control point to retrieve the text message prior from the service data point prior to forwarding of the text message to the called party.

14. The method of claim 11, further comprising converting the text message from a first language to a second language.

15. The method of claim 11, wherein the service control point forwards the text message to the called party at a called party routing address, and wherein the routing address is an address of a media formatter.

16. The method of claim 15, wherein the media formatter is one of an electronic mail generator, a facsimile generator, a computer memo generator, an ISDN transmission generator, a packet switching generator, and a mobile data generator.

17. The method of claim 11, wherein the menu of requested information from the calling party requires that the response from the calling party be one of a voice response or a DTMF response.

18. The method of claim 11, wherein the menu of requested information generated by the prompter requires the calling party to identify a type of media formatter which is to receive the text message.

19. The method of claim 18, wherein the media formatter being one of an electronic mail generator, a facsimile generator, a computer memo generator, an ISDN transmission generator, a packet switching generator, and a mobile data generator.

20. The method of claim 11, further comprising forwarding the text message to a distribution list of called parties in accordance with a response from the calling party to at least some of the requested information.

21. The method of claim 11, wherein the forwarding of the text message to a called party comprises ordering a media formatter to fetch the text message from a service data point whereat the text message is stored.

* * * * *